United States Patent [19]
Golub et al.

[11] Patent Number: 5,794,035
[45] Date of Patent: Aug. 11, 1998

[54] DEVICE DRIVER AND INPUT/OUTPUT HARDWARE RESEARCH MANAGER

[75] Inventors: David Barnett Golub, Indiana, Pa.; Freeman Leigh Rawson, III, Boca Raton; Guy Gil Sotomayor, Jr., West Palm Beach, both of Fla.

[73] Assignee: International Business Machines Corporation, Armonk, N.Y.

[21] Appl. No.: 858,196

[22] Filed: Apr. 24, 1997

Related U.S. Application Data

[63] Continuation of Ser. No. 522,799, Sep. 1, 1995, abandoned, which is a continuation of Ser. No. 165,995, Dec. 13, 1993, abandoned.

[51] Int. Cl.$^6$ .................................................. G06F 13/00
[52] U.S. Cl. .................. 395/674; 395/800.01; 395/653; 395/681; 395/821
[58] Field of Search .................... 395/800.01, 674, 395/653, 183.19, 427, 681, 821

[56] References Cited

U.S. PATENT DOCUMENTS

| | | | |
|---|---|---|---|
| 4,589,063 | 5/1986 | Shah et al. | 364/DIG. 1 |
| 4,638,424 | 1/1987 | Beglin et al. | 364/DIG. 1 |
| 4,974,151 | 11/1990 | Aduani et al. | 364/DIG. 1 |
| 5,115,499 | 5/1992 | Stiffler et al. | |
| 5,265,251 | 11/1993 | Agarawal et al. | 395/650 |
| 5,265,252 | 11/1993 | Rawson, III et al. | 395/700 |
| 5,307,496 | 4/1994 | Ichinose et al. | 395/650 |
| 5,327,560 | 7/1994 | Hirata et al. | 395/653 |
| 5,349,674 | 9/1994 | Calvert et al. | 395/200.57 |
| 5,361,347 | 11/1994 | Glider et al. | 395/575 |
| 5,394,542 | 2/1995 | Frey et al. | 395/183.19 |
| 5,442,791 | 8/1995 | Wrabetz et al. | 395/674 |
| 5,522,070 | 5/1996 | Suimoto | 395/650 |

FOREIGN PATENT DOCUMENTS

| | | |
|---|---|---|
| 0358304 | 3/1990 | European Pat. Off. |
| 5120294 | 5/1993 | Japan |

OTHER PUBLICATIONS

Anderson, "Experience with Flamingo: A Distributed, Object-Oriented User Interface System,"OOPSLA '86 Proceedings, Sep. 1986, pp. 177–185.

Engelstad et al., "A Dynamic C-Based Object-Oriented System for UNIX", *IEEE Software*, May 1991, pp. 73–85.

Kaiser, Transactions for Concurrent Object-Oriented Programming Systems, SIGPLAN, Apr. 1989, 24:4, pp. 136–138.

Yaseen et al., "An Extensible Kernel Object Management System", OOPSLA '91, May 1991, pp. 247–263.

Horwat, Waldemar; Chien, Andrew A.; Dally, William J., "Experience with CST: Programming and Implementation", *ACM SIGPLAN '89*, Jun. 1989, pp. 101–109.

Imielinski, Tomasz; Naqvi, Shamin; Vadaparty, kumar, "Incomplete Objects—A Data Model for Design and Planning Applications", *ACM*, Feb. 1991, pp. 288–297.

Yaseen, Rahim; Su, Stanley Y.W.; and Lam, Herman, "An Extensible Kernel Object-Management System", *OOPSLA '91*, May 1991, pp. 247–263.

*Primary Examiner*—Alyssa H. Bowler
*Assistant Examiner*—Walter D. Davis, Jr.
*Attorney, Agent, or Firm*—Whitham, Curtis & Whitham; Mark S. Walker

[57] ABSTRACT

A system and method is provide for managing input/output (I/O) resources in a computer system. The system includes a hardware resource manager which tracks the use of the I/O resources. In addition, the hardware resource manager can allocate the resources between device drivers and provide a standard implementation to be used by device drivers.

8 Claims, 8 Drawing Sheets

DEVICE DRIVER AND INPUT/OUTPUT HARDWARE RESEARCH MANAGER

CROSS-REFERENCE TO RELATED APPLICATIONS

This application is a continuation of U.S. patent application Ser. No. 08/522,799, filed on Sep. 1, 1995, now abandoned, which was a continuation of 08/165,995, filed on Dec. 13, 1993, now abandoned.

BACKGROUND OF THE INVENTION

1. Field of the Invention

The present invention generally relates to managing input/output (I/O) resources in a computer system and, more particularly, to a hardware resource manager (HRM) which tracks the I/O resources and allocates the resources to device drivers as the drivers request them. This invention is preferably implemented using object oriented programming methods.

2. Description of the Prior Art

A device driver is a software process that controls a hardware device connected to an I/O channel of a computer system. For example, the UNIX® operating system (OS) uses a file system in the form of a data structure resident on disk which includes a file for each hardware device. Inside the OS kernel, references to a specific hardware device file are converted to hardware commands to access a tape or the like.

Prior art device driver models typically have no clear mechanism for identifying the hardware resources that are needed by the device driver. Each individual device driver usually includes its own mechanisms. Since there is no standard mechanism for identifying the resources needed, device drivers are forced to make educated guesses about the hardware resources that are present. These ad-hoc resource identification schemes usually result in device drivers which use any identified resources. Collisions between device drivers utilizing the same hardware resources are only prevented by diverse hardware implementations.

A significant problem with the ad-hoc schemes used in previous device driver models is that the determination of the hardware resources present is very sensitive to a particular system implementation. This leads to device drivers that are specific not only to a particular hardware device, but also to the resource identification method used by the device driver. The ad-hoc resource identification mechanisms also result in a fairly static device driver model, since the device drivers usually perform the identification only during initialization. The identification can not be performed when the device is in actual operation since it may not function reliably or it may cause perturbations to the device or, worse, to the system itself. The need for a more dynamic device driver model becomes extremely important with some of the newly emerging technologies, for example PCMCIA (Personal Computer Memory Card Interface Association) standard cards.

In addition, the use of virtual screens in many systems raises the problem of resource allocation. The use of virtual screens allows several applications to run on the system and each application believes that it has exclusive access to the display hardware. There is currently no standard way for device drivers to share identical hardware.

SUMMARY OF THE INVENTION

It is therefore an object of the present invention to provide a dynamic device driver model which functions reliably when the device is in operation.

It is another object of the present invention to provide a data base of resources which can be queried by device drivers.

It is a further object of the present invention to provide a method for the tracking and allocation of I/O resources for device drivers.

It is also an object of the present invention to provide a means for a plurality of device drivers to share a set of hardware resources.

According to the invention, a hardware resource manager (HRM) provides a data base of I/O resources to device drivers, the data base can be queried by the drivers at any time to determine what resources are present. In addition, the HRM provides a method for tracking and allocating resources between the device drivers. The HRM provides device drivers with a standard resource identification system. The device drivers only need to query and interact with the data base. The device drivers are only dependent upon a particular implementation of the HRM and therefore, no longer need to be implemented separately for different operating systems. The data base provided by the HRM can also be updated dynamically, allowing the device drivers to receive up to date information regarding relevant changes in the hardware configuration.

The method for tracking and allocating resources provided by the HRM allows several device drivers to share the same physical set of hardware resources. The device driver can not only query the HRM for a particular hardware resource, but also the driver can request the resource. If a resource is requested, the HRM determines whether another device is currently using the resource. If not, the resource is allocated to the requesting device driver. If the resource is being used, the HRM can request that the device driver give up the resource. The reply of the initial device determines any further action taken by the HRM.

The dynamic nature of the HRM system allows new devices to be easily added. This problem often arises when the device and its controller hardware have been used over a long period of time and the device driver has been written specifically for the device and controller being used. At some point, a new and totally different device is developed, however, it still uses the same controller, usually with the original device still attached; e.g., a second disk drive attached to the controller to which the original disk drive was attached. This usually requires the original device driver to be rewritten to support both device types. However, the use of the HRM, according to the invention, permits two different device drivers to be written for the two different device/controller pairs. Each device driver would be ignorant of the presence of the other.

The ability of the HRM to incorporate new information dynamically also allows the system to remain functional even in the face of partial failures and during the diagnosis of the failures. The HRM allows a diagnostic program to obtain the hardware resources necessary to perform the diagnostics. Any device driver which had previously used the hardware would be largely unaware of the fact that diagnostics were currently being performed. Furthermore, the incorporation of the diagnostic functions into the HRM allows the programmer of the device driver to concentrate on providing high quality and high performance device driver software. Likewise, the programmer of the diagnostic software can focus on providing diagnostic software that can detect numerous problems and potential problems with a piece of hardware.

BRIEF DESCRIPTION OF THE DRAWINGS

The foregoing and other objects, aspects and advantages will be better understood from the following detailed description of a preferred embodiment of the invention with reference to the drawings, in which:

FIGS. 4a through 4d are object diagrams showing a Grant/Yield protocol example using the sample data base as shown in FIGS. 2 and 3, and more particularly.

DETAILED DESCRIPTION OF A PREFERRED EMBODIMENT OF THE INVENTION

The hardware resource manager (HRM) is a collection of computer programs which manage the variety of hardware resources associated with a computer system. The HRM allows device drivers and other software subsystems to access the physical hardware resources. The HRM is preferably implemented in an object oriented programming language. However, it is also envisioned that hierarchical and other programming techniques could be used to successfully implement the invention as described.

The concepts and terminology used to describe the HRM data base are those used in the field of computer science known as object oriented programming (OOP). OOP is the preferred environment for building user-friendly, intelligent computer software. Key elements of OOP are data encapsulation, inheritance and polymorphism. These elements may be used to generate a graphical user interface (GUI), typically characterized by a windowing environment having icons, mouse cursors and menus. While these three key elements are common to OOP languages, most OOP languages implement the three key elements differently.

Examples of OOP languages are Smalltalk, Object Pascal and C++. Smalltalk is actually more than a language; it might more accurately be characterized as a programming environment. Smalltalk was developed in the Learning Research Group at Xerox's Palo Alto Research Center (PARC) in the early 1970s. In Smalltalk, a message is sent to an object to evaluate the object itself. Messages perform a task similar to that of function calls in conventional programming languages. The programmer does not need to be concerned with the type of data; rather, the programmer need only be concerned with creating the right order of a message and using the right message. Object Pascal is the language used for Apple's Macintosh® computers. Apple developed Object Pascal with the collaboration of Niklaus Wirth, the designer of Pascal. C++ was developed by Bjarne Stroustrup at the AT&T Bell Laboratories in 1983 as an extension of C, which is the language in which the UNIX® operating system is written. The key concept of C++ is class, which is a user-defined type. Classes provide object oriented programming features and typically has two kinds of clients called instances and subclasses. C++ modules are compatible with C modules and can be linked freely so that existing C libraries may be used with C++ programs. The preferred embodiment of the invention is written in C++.

The most widely used object based and object oriented programming languages trace their heritage to Simula developed in the 1960s by O-J. Dahl, B. Myhrhaug and K. Nygard of Norway. Further information on the subject of Object Oriented Programming may be had by reference to *Object Oriented Design with Applications* by Grady Booch, The Benjamin/Cummings Publishing Co., Inc., Redwood City, Calif. (1991), and *An Introduction to Object-Oriented Programming* by Timothy Budd, Addison-Wesley Publishing Co. (1991).

As was noted supra, the HRM is comprised of a collection of programs. These programs fall generally into one of four categories. The first type of program is the name service. There is only one program of this type in each HRM and it is a registry of information and is responsible for maintaining the local name space of the system. The name service is a standard part of the I/O system and its main function is to allow different programs to obtain information about each other. All of the services available to program tasks are maintained in the name service so that all tasks can access the desired services. The second category of programs are resource manager objects. These programs provide an anchor point for the various Bus Managers that comprise the bulk of the HRM. The third type of programs are the Bus Managers which provide the key functionality of the HRM. Each bus has a specific Bus Manager which contains a data base of all hardware resources which exist in a system. Some examples of common buses include the MicroChannel® bus and the small computer system interface (SCSI) bus. In addition, the Bus Managers implement the "Grant/Yield" protocol which allows other components in the system to gain access to the various hardware resources. The fourth category of programs, the Bus Walkers, are associated with a specific Bus Manager and are responsible for loading the data base with information which is consistent with the type of bus to be managed. In some cases, the Bus Walker is a simple program that can read a script file and use this information to load its Bus Manager's data base. However, in other cases, the Bus Walker must read a collection of files and use the information to interpret a hardware prepared data base (i.e., in nonvolatile RAM) to load its Bus Manager's data base.

The data base representing all of the hardware resources in the system is distributed in the various Bus Managers. The data base is maintained by the Bus Managers and is non-persistent. Each Bus Manager keeps its data base in its memory image as a collection of data structures that can be queried and manipulated. The interaction between the various data bases is minimal and is limited to what is provided through the HRM interfaces.

Figure 1:
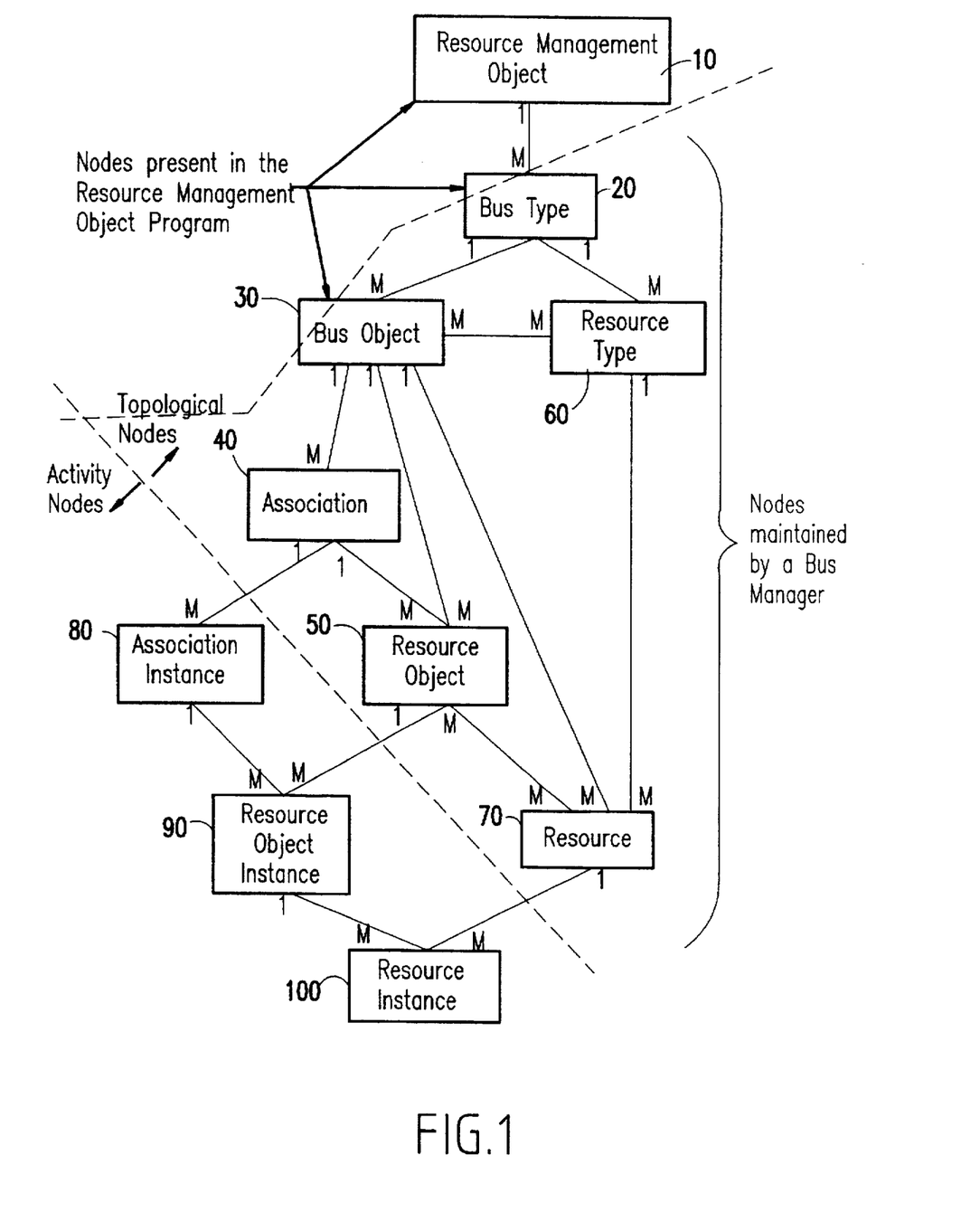
FIG. 1 is an object diagram showing entity relationships in a sample HRM data base.

Referring now to the drawings, and more particularly to FIG. 1, there is shown an object diagram of the Hardware Resource Manager (HRM) data base. The data base is organized as a tree, with the nodes of the tree representing the various hardware resources present in the system. The size and shape of the tree is determined by the types of resources present and the relationships between resources. Each branch of the tree represents a particular type of object and there are limitations on which nodes can be parents or children of other nodes. In addition to showing the relationships between the various nodes, FIG. 1 shows the programs that contain each of the nodes and the type of the nodes (i.e., topological nodes and activity nodes).

Referring again to FIG. 1, the nodes in the tree can be divided into two major categories. The first type are nodes that describe the topology of the system or, in other words, identify what resources exist in the system. The second category are those nodes that describe the activity of the system, or what resources are currently being used in the system. The activity nodes of the system are depicted as subtrees that shadow the portion of the topological nodes for which activity is being represented. It is important to note here that there may be more than one activity subtree for a particular topological node. This structure is important to the yield/grant protocol and allows multiple clients to gain access to the same physical resources.

There are a number of types of topological nodes and each node is of a particular type. As shown in FIG. 1, the first type of node is a resource manager object 10. This object is used by the resource manager object program to associate the various Bus Types and Bus Objects with the tree. A second type of node is a Bus Type 20 which identifies the type of bus that the Bus Manager supports and can export this information. Examples of bus types might include Micro-Channel® architecture (MCA), AT Bus or industry standard architecture (ISA) and its superset extended ISA (EISA), and small computer system interface (SCSI). The Bus Object node 30 is created by a Bus Manager and identifies the presence of a physical bus of the type that the Bus Manager supports. The next type of node, an Association node 40, is used to group one or more Resource Objects into a single entity. This allows several physical entities to be grouped together into a logical entity. A Resource Object node 50 is used to group one or more Resources into a single entity, allowing several physical resources to be grouped together in a form which is analogous to a controller. The Resource Type node 60 is used to indicate the type and attributes of a resource. Some examples of resource types include I/O ports, I/O memory, and interrupt levels. A final type of node is the Resource node 70 which is used to represent a single physical resource. Examples include interrupt level, a contiguous range of I/O ports, or a contiguous range of I/O memory.

There are also specific activity node types which are created when a client wishes to use the resources represented by a topological subtree. Each activity node represents an active instance of a corresponding topological node. As shown in FIG. 1, three examples of types of activity nodes are Association Instance 80, Resource Object Instance 90 and Resource Instance 100. An active instance of a topological subtree is created at the top of the subtree. A completely active subtree is created when the node at the top of the subtree is activated. An example is presented for a topological subtree which consists of a resource object and three resources. First, the resource object instance is created and at the same time, a resource instance is created for each of the three resources. Each of the resource instances will be linked not only to the resource each represents, but also to the resource object instance which triggered their creation. Furthermore, if an association instance had been created, then, resource object instances will be created for all of the resource objects under this association and respectively, resource instances will be created for each resource object. As these examples illustrates, each corresponding activity subtree and topological subtree must be identical.

There are several things that may not be immediately obvious from FIG. 1. Firstly, a single Bus Type is maintained by a single Bus Manager. It is possible for a single executable program to support more than one Bus Type, however, this is treated as multiple Bus Managers. On the other hand, it is likely that a single Bus Manager may support multiple Bus Objects (which represent physical buses). Secondly, the Bus Type and Resource Type nodes are defined by the Bus Manager and are not dependent upon the content of the remainder of the data base. Therefore, they are always present in the data base. In contrast, all of the remaining nodes, with the exception of the Resource Manager Object, are placed into the data base by Bus Walkers.

Figure 2:
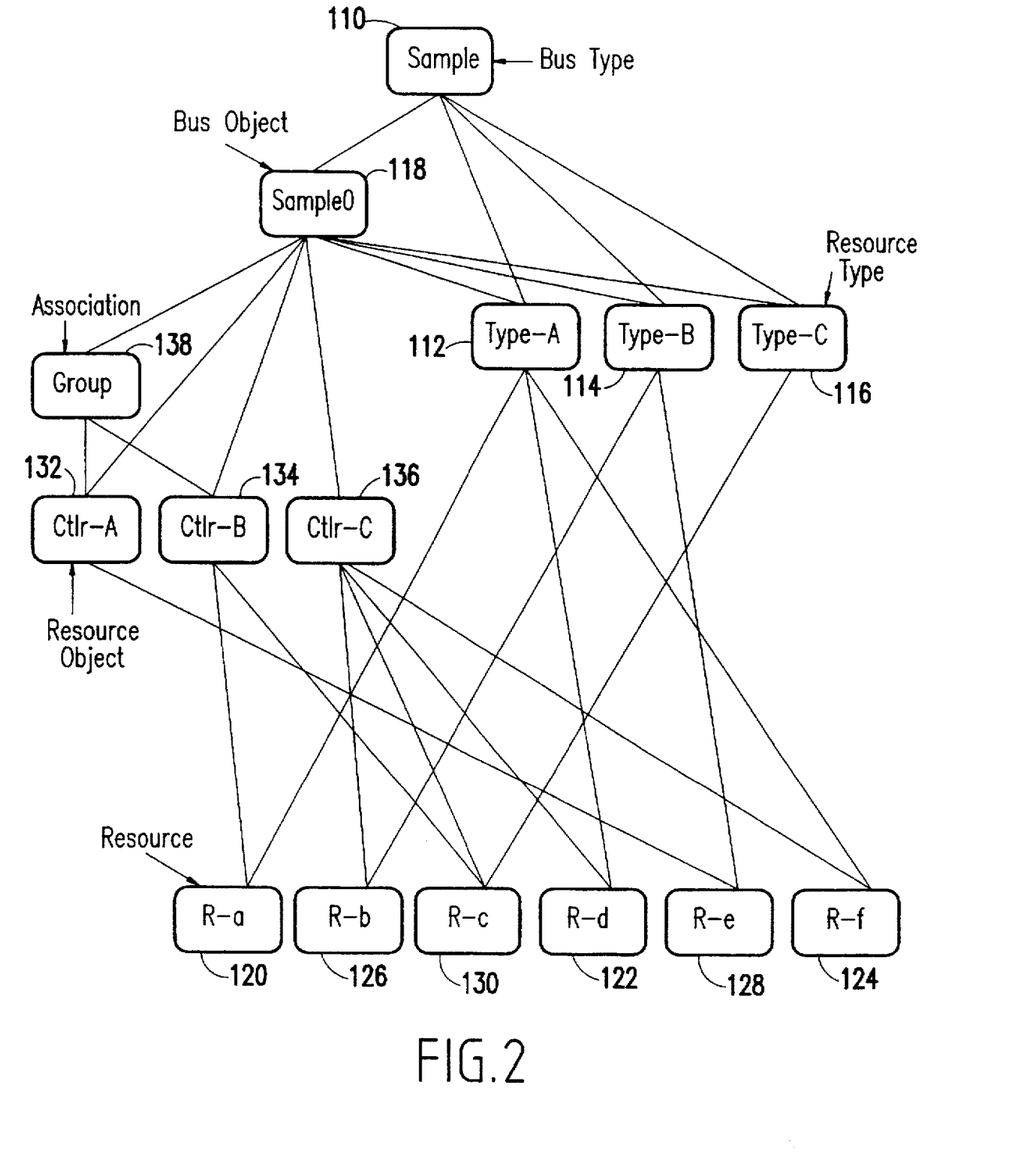
FIG. 2 is an object diagram showing only the topological nodes in a sample HRM data base.

FIG. 2 illustrates a simplified sample of an HRM data base with only the topological nodes present allowing the topological structure to be easily observed. It is important to note that each topological node has information associated with it including a name. The name is used in the data structure to represent the node and is also used by the HRM in the name service program. It should be noted that in order to simplify the diagram, the links between the Bus Object node and the Resource nodes have not been shown.

As shown in the HRM data base in FIG. 2, Sample 110 is a Bus Type. This Bus Type has three types of resources, Type-A 112, Type-B 114 and Type-C 116, that can be used with the bus. Sample0 118 represents a physical bus which is to be managed by the Bus Manager. Sample0 has six Resources attached, however, as noted above, the connections between them are not shown in the figure. Resources R-a 120, R-d 122 and R-f 124 have a Resource Type of Type-A. Resources R-b 126 and R-e 128 have a Resource Type of Type-C. Finally, Resource R-c 130 has a Resource Type of Type-B. The resources are organized into Resource Objects and in this example, the six resources are grouped into three Resource Objects. The first Resource Object, Ctlr-A 132, contains a single Resource R-e. The second Resource Object, Ctlr-B 134, contains two Resources R-a and R-c. The final Resource Object, Ctlr-C 136, contains four Resources R-b, R-c, R-d, and R-f. An Association, Group 138, contains two of the Resource Objects Ctlr-A and Ctlr-B. It is important to note that Resource R-c is contained in two Resource Objects, Ctlr-B and Ctlr-C. This allows multiple users to access the same Resource. The behavior of the Resource is determined by the Resource Type. The Resource can be sharable, allowing multiple users to simultaneously access the Resource. In other cases, the resource may be non-sharable, thereby restricting access to the Resource to a single user at a time.

Figure 3:
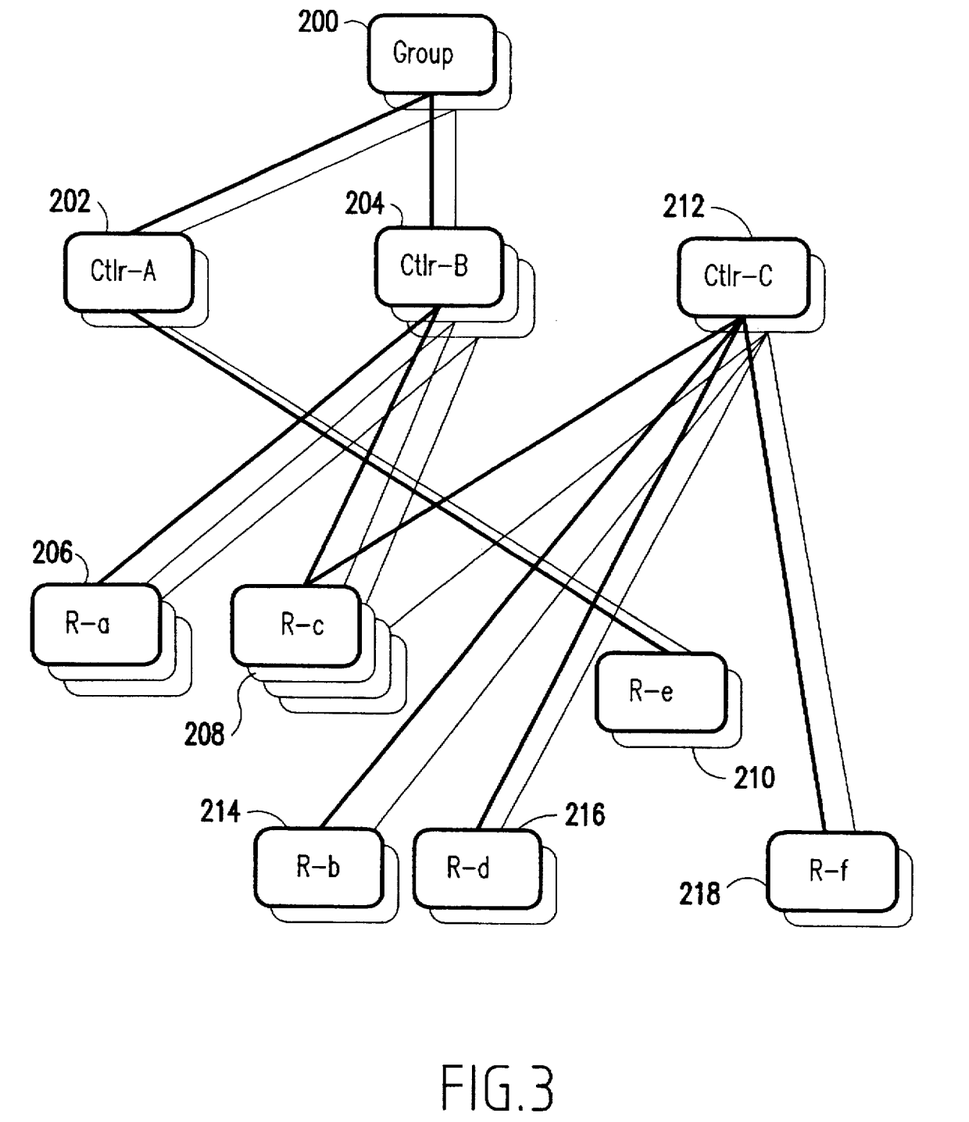
FIG. 3 is an object diagram illustrating the HRM data base with activity nodes, the data base is a subset of the data base shown in FIG. 2.

FIG. 3 provides an illustration of the relationships between activity nodes and topological nodes in the HRM data base. In order to simplify the diagram, only the topological nodes that are shadowed by activity nodes are shown. FIG. 3, is a subset of the nodes shown in FIG. 2 and FIG. 3 will be described with reference to the information provided supra.

With reference to FIG. 3, the darker nodes represent topological nodes and the darker lines show their relationships to each other. The lighter nodes represent activity nodes and the lighter lines show their relationships to each other. The activity nodes are placed in the "shadow" of the topological nodes with which they are associated. The tree and relationships shown in FIG. 3 represent a snap shot in time of the activity nodes. It should be noted that topological nodes can be dynamically added or removed. However, the changes are usually dependent on changes to the physical configuration of the system. On the other hand, since activity nodes reflect the usage of various parts of the system, they are usually added and removed from the HRM's data base with a greater frequency than topological nodes.

The configuration of the data base shown in FIG. 3 illustrates an end result of nodes after the HRM has tracked and allocated some of the resources in the system. However, it should be understood that the following description is but one possible scenario of the actions which could have occurred and produced the results shown. The creation of an active instance node for an Association or a Resource Object signals the HRM to create active instances for all nodes in the subtree. In this case, the first step is the creation of an active instance of Group 200, an Association. This automatically creates active instances of Resource Objects Ctlr-A 202 and Ctlr-B 204. In addition, active instances for the Resources contained in the Resource Objects are created. Therefore, active instances have been created for the Resources R-a 206, R-c 208 and R-e 210. After the active instance of Group is created, a separate active instance for the Resource Object Ctlr-B is created. The creation of the active instance of Ctlr-B causes active instances for the Resources R-a and R-c to be created. Finally, an active instance for the Resource Object Ctlr-C 212 is created which causes active instances to be created for the Resources R-b 214, R-c 208, R-d 216, and R-f 218.

Although the activity subtree has now been created in the HRM data base, the client of the HRM still does not have access to the actual resources represented by the subtree. A client can obtain access to the resources by requesting them. The request is usually to an entire subtree (i.e., an Association or a Resource Object) rather than to individual resources.

The request to a resource can be made by several clients of the HRM at the same time. This conflict requires the HRM to allocate the resources between the clients. A "Grant/Yield" protocol is used by the HRM to determine which client can access the resource. This protocol is invoked when a client requests a set of Resources. The first step is for the HRM to determine if another client is currently accessing these Resources. If not, the HRM directly grants the Resources to the requesting client. On the other hand, if another client is accessing the Resources, the HRM must inquire as to whether and when the other client can yield the Resources. The result determines if the requesting client can access the Resources or if the requesting client must wait until the original client is willing to yield the Resources.

An illustration of the "Grant/Yield" protocol is provided in FIGS. 4a through 4d. These figures are based upon HRM data base example as illustrated in FIGS. 2 and 3 and as discussed supra. These figures illustrate the activity of three HRM clients, a, b and g. Client a represents a client that created an activity subtree starting with the Association, Group. Client b represents a client that created an activity subtree starting at the Resource Object, Ctlr-B. Finally, client g represents a client that created an activity subtree starting at the Resource Object, Ctlr-C.

Figure 4A:
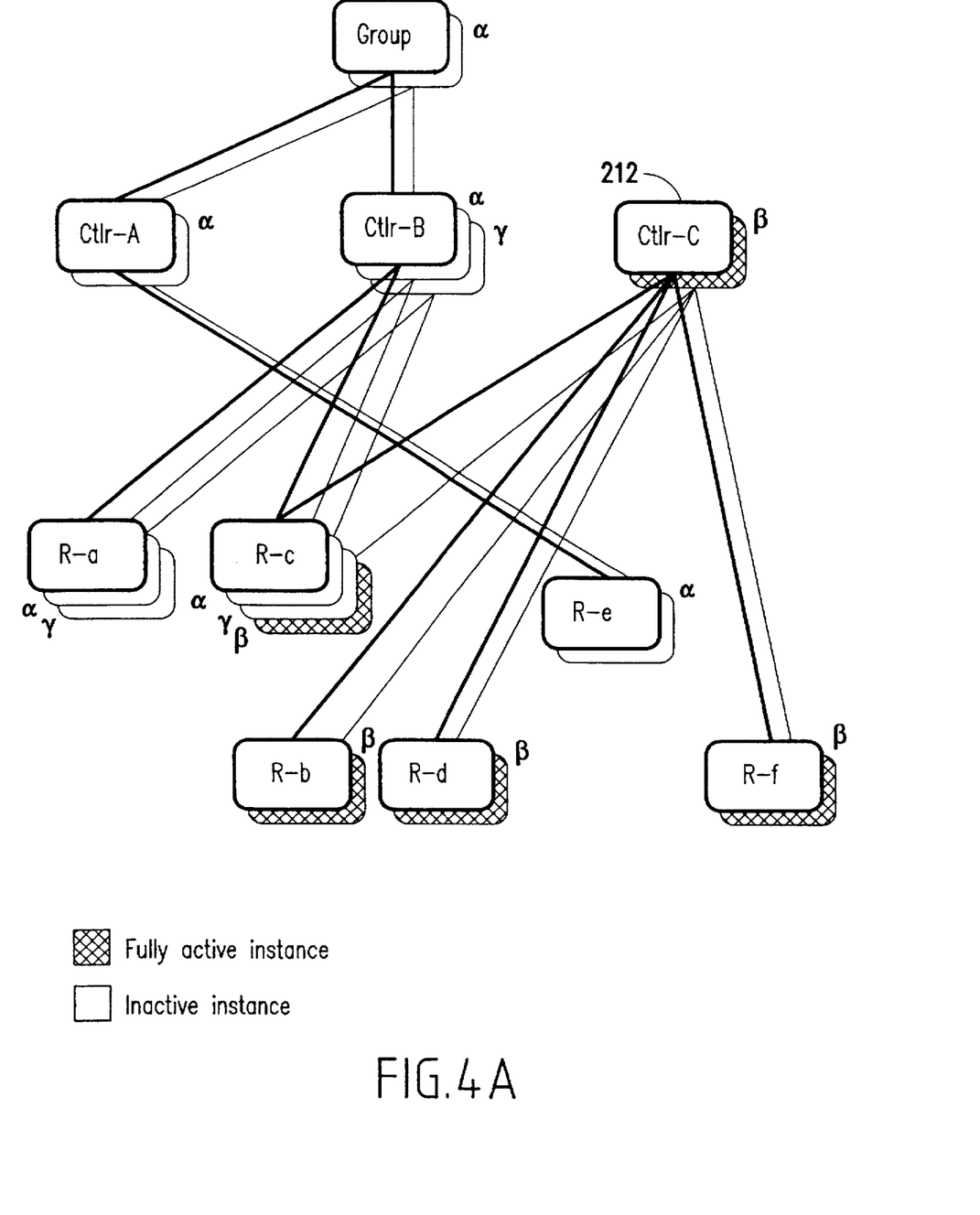
FIG. 4a is an illustration of the initial state of the data base.

FIG. 4a illustrates an initial state of an HRM data base, wherein client b has requested that its instance of Ctlr-C 212 be made fully active, so that client b will have full access to the hardware resources in the Ctlr-C subtree. The activity nodes which are active are indicated by shading. At this point, in order to illustrate the protocol used by the HRM, client a will request access to the resources represented by the Group subtree.

Figure 4B:
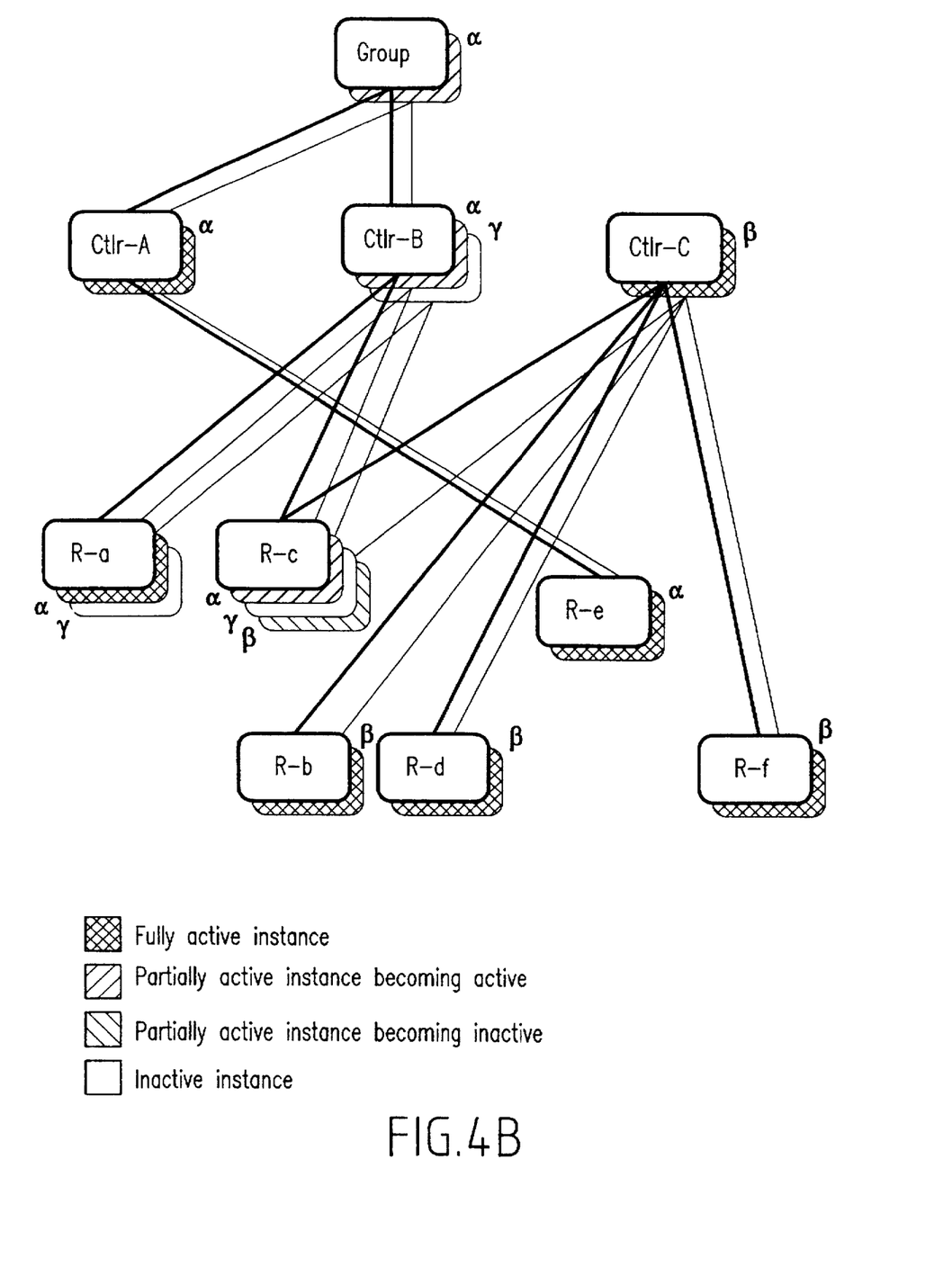
FIG. 4b is an illustration of a device driver requesting access to an I/O resource.

FIG. 4b shows the state of the HRM data base after client a has requested access to the resources in Group subtree. A number of steps have been performed by the HRM to change the state of the data base from the one shown in FIG. 4a to that shown in FIG. 4b. The first step in the transformation process is that the state of Client a's instance 300 of Group is changed to going active. Then, the HRM begins to activate all of the subtrees of the Resource Object instances that are part of client a's Group instance. In this example, Ctlr-A and Ctlr-B are the affected Resource Object instances. Therefore, the state of client a's instance of Ctlr-A 320 is marked as going active and the HRM begins to activate the Resources that are included in client a's Ctlr-A instance. The only Resource, in this example, which must be activated is R-e. The HRM queries the R-e Resource node to determine if the resource is already active. Since it is not active, the HRM can change client a's instance of R-e 330 to fully active. The procedure for making the instance fully active are defined in the Resource Type for the particular resource. At this point, the HRM continues through the remaining Resource instances for client a which are in the Ctlr-A subtree. Since, in this example, no other Resource instances are present and the HRM has fully activated R-e, the HRM can now change client a's instance of Ctlr-A 320 to fully active. Now, the HRM can send a Grant message to client a indicating that the client has full access to all of the resources which are contained in the Resource Object. At this time, the HRM will continue on to the remaining Resource Objects in the Association, if any exist. In this example, Ctlr-B is the only remaining Resource Object. Therefore, the state of client a's instance of Ctlr-B 330 is changed to indicate that it is becoming active. The actions taken by the HRM with regard to the first Resource associated with Ctlr-B, R-a, are similar to those discussed supra for R-e. However, in this case, Ctlr-B has a second Resource associated with it, R-c. The HRM marks the state of client a's instance of R-c 340 as becoming active and inquires as to whether there is another instance of Resource R-c that is active. For this Resource, the instance for client b 350 is already active. Therefore, the HRM marks the instance for client b as becoming inactive and then, must inquire as to whether client b is willing to yield the resource(s). Client b can either respond "yield", "later", "arbitrate" or "no". If the client is willing to yield the resource(s), it must save the current state of the resource(s). If the current client cannot immediately yield, but will be able to yield in the near future, it responds "later". In the case of a client which does not have enough information to determine if it can yield, the client responds "arbitrate" and another part of the system makes the decision. Finally, if the resource is critical and cannot be given up, the client will respond "no". In this example, it is assumed that client b is willing to yield access to the Resource. Therefore, client b must save any state which is relevant to the Resource and must assume that it no longer has any access to the Resource.

Figure 4C:
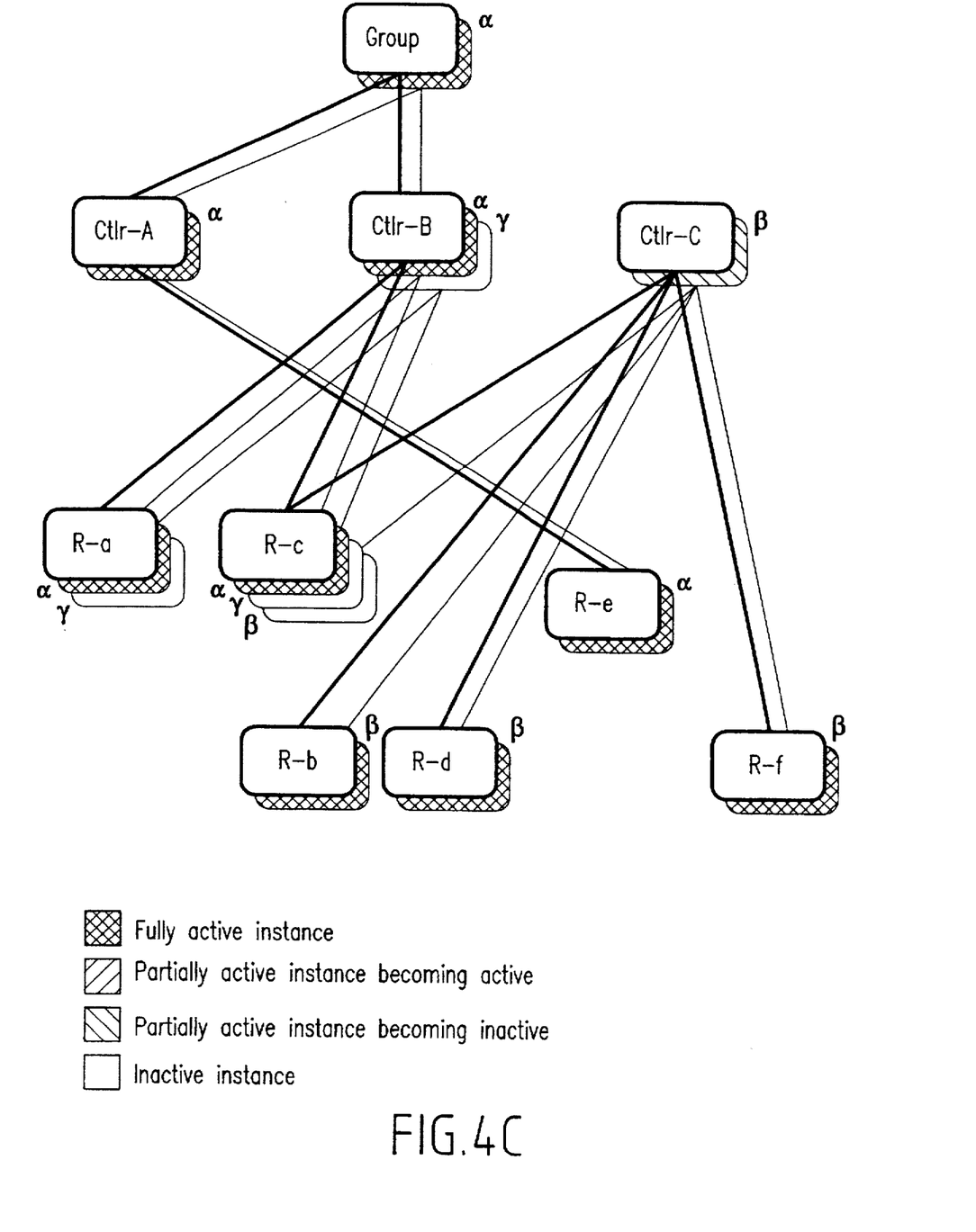
FIG. 4c shows the state of the data base when a device driver receives access.

FIG. 4c illustrates the data base after client b has yielded access for Resource R-c and is used to demonstrate the steps of the HRM after this process has occurred. After the HRM is notified that client b has yielded access to the Resource, the state of client a's instance for R-c is changed to fully active. The HRM would now continue on to other Resource instances of Ctlr-B for client a. Since there are none remaining, the HRM will modify the state of client a's instance of Ctlr-B to be fully active. At this point, the Resource Object, Ctlr-B, is fully active and the HRM will notify client a that it has complete access to all of the Resources in this Resource Object. In addition, since there are no more Resource Objects associated with Group, the state of the a instance of Group can be changed to active and client a is notified.

Figure 4D:
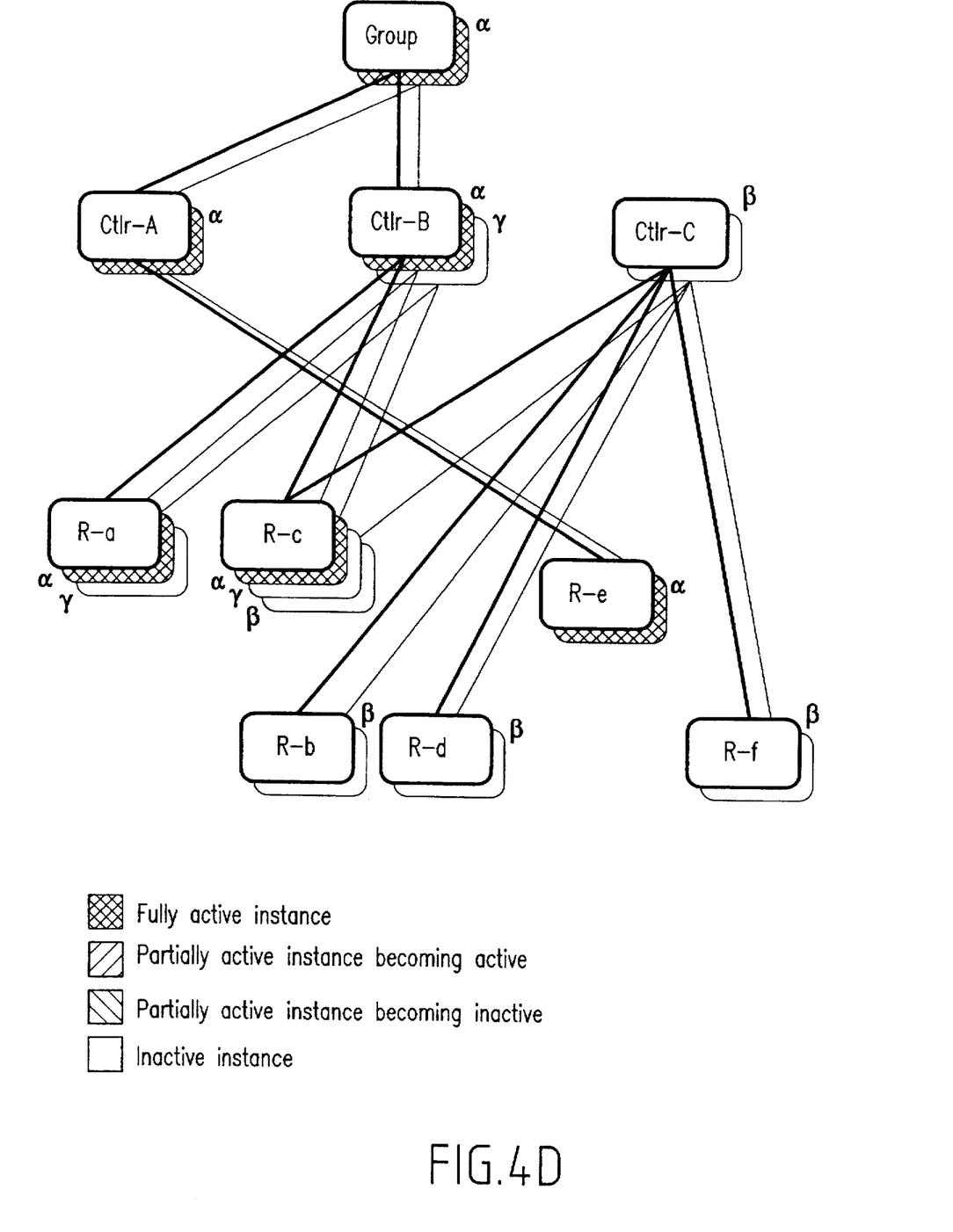
FIG. 4d is an illustration of the original device driver yielding access to the resource.

The original client using a resource will usually voluntarily yield the remaining Resources associated with the Resource Object, since it is generally interested in a collection of Resources and not in a particular individual Resource. Therefore, as shown in FIG. 4c, the b instance of Ctlr-C 360 is set to becoming inactive and the HRM will proceed to inactivate the remaining instances in which client b is still active. Then, the HRM examines each of the Resource instances corresponding to client b's Resource Object instance for Ctlr-C to determine if any are active. Each time the HRM encounters an active instance, the HRM changes the state of the instance to becoming inactive and then sends a Yield message to the client. As discussed supra, the client responds as to whether it is willing to yield or not. Assuming the client yields, the client saves the remaining residual state of the hardware which is represented by the Resource and then responds to the HRM. On receiving the reply, the HRM changes the state of the instance to inactive. The HRM continues through all of the Resources until all are yielded and then the HRM changes the state of the Resource Object instance to inactive. Finally, the HRM notifies client b that the Resource Object instance has been yielded. FIG. 4d illustrates the data base after client b has yielded access to all of the Resources it had access to.

A Bus Walker is a program which is responsible for loading the HRM data base in a system defined manner. Each bus has an associated Bus Walker which obtains its configuration information for the particular system. This system permits the HRM to be completely independent of the method in which the configuration information is obtained for each particular system. The HRM need only be aware of the specifics for the buses it supports.

Figure 5:
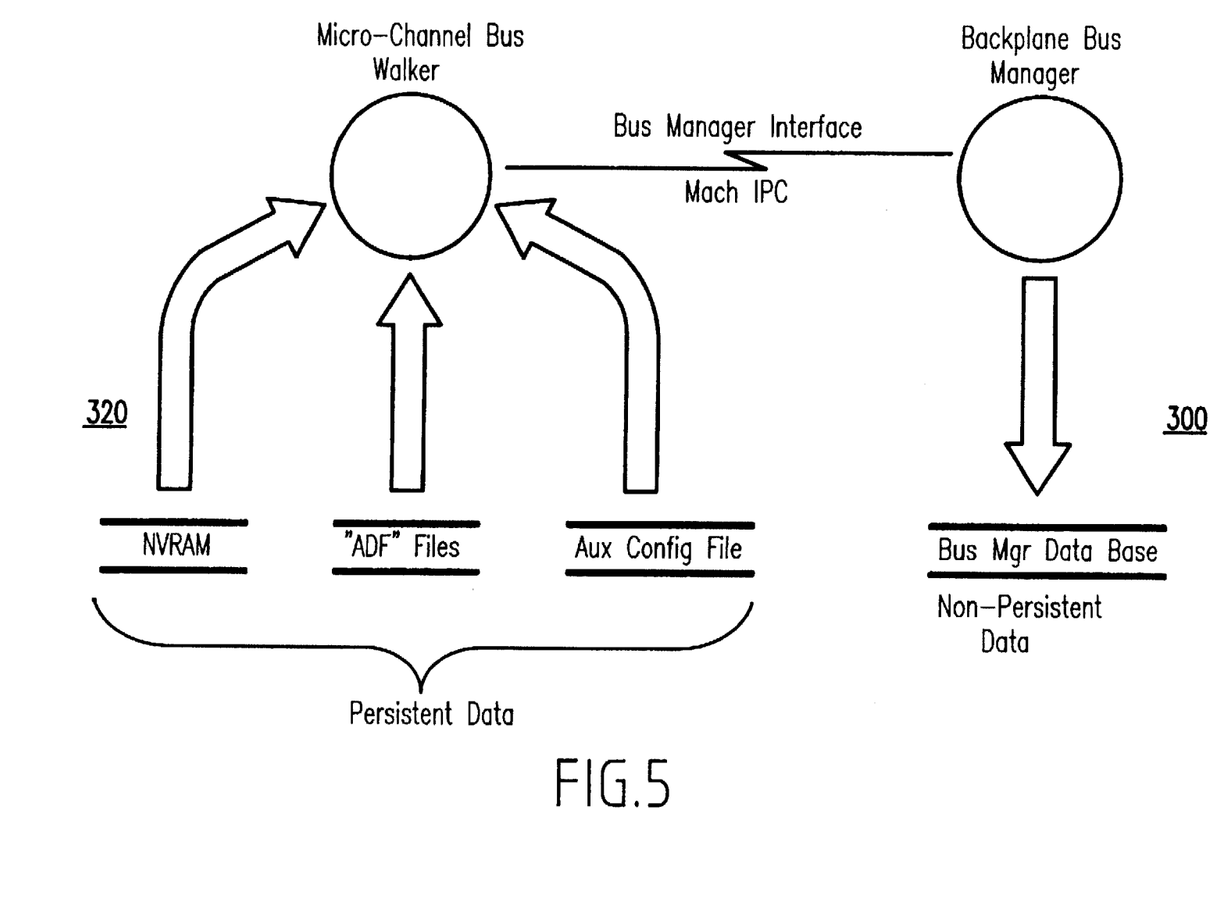
FIG. 5 is a diagram illustrating an example of the Bus Walker which provides device services.

An example of some different types of Bus Walkers for a bus type is illustrated in FIG. 5. This example shows the backplane bus, which is the connection point for the majority of the I/O resources for a computer system. This bus usually has slots for plugging in expansion or adaptor cards. In addition, the backplane bus also includes I/O devices which reside on the planar or the motherboard of the computer system.

In some systems, as shown in FIG. 5, there is no direct means for determining the hardware configuration 300. Therefore, these systems must rely on a data file which contains a representation of the hardware configuration or must query the I/O register for a determination of whether the hardware is present. The Bus Walker can use either or both of these methods to load the HRM database with the current hardware configuration.

In other cases, the system keeps the hardware configuration in a persistent medium 320, for example in RAM which has a battery backup. However, this information is usually encoded and therefore requires auxiliary data files to interpret the hardware configuration. This information can then be used by the Bus Walker to load the HRM data base.

The HRM provides the interface to the Bus Walker so that the Bus Walker can load the HRM data base. However, the Bus Walker system isolates the HRM from the specifics of the configuration of an individual system. Therefore, the HRM is more easily ported to different system configurations and types.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A hardware resource manager for managing device driver detection, acquisition and use of hardware resources of a computer system, comprising:

logical representation means for logically representing hardware resources as a hierarchical topology of resources, said logical representation means storing data representative of said hardware resources as at least a resource bus type and resource type that is hierarchically subordinate to said resource bus type;

active representation means for representing active hardware as one or more instances of said resource type, said instances being hierarchically subordinate to said resource type;

dynamic update means for dynamically updating said hardware resources in said logical representation means to reflect new devices added to the computer system; and allocation means for allocating resources to satisfy a device driver hardware resource request, said allocation means creating resource type instances in said active representation means.

2. A hardware resource manager for managing I/O resource path information, as recited in claim 1, wherein said hardware resource manager includes a collection of computer programs, one of said computer programs obtaining hardware configuration information for each type of input/output resource path.

3. A hardware resource manager for managing I/O resource path information, as recited in claim 2, wherein said allocation means implements a grant/yield protocol in which said input/output resource paths may be requested and allocated between a plurality of device drivers.

4. A hardware resource manager for managing I/O resource path information, as recited in claim 3, wherein said allocation means comprises:

means responsive to a first device driver requesting one of said input/output resource paths;

means determining whether said one of said input/output resource paths is currently in use by a second device driver; and means responsive to said means for determining for assigning one of said input/output resource paths to said first device driver if said resource path is not currently in use by said second device driver and querying said second device driver as to whether it will release said input/output resource path if said resource path is currently in use and notifying said first device driver as to whether it can access said input/output resource path.

5. A method implemented by a hardware resource manager for managing device driver detection, acquisition and use of hardware resources of a computer system, comprising the steps of:

logically representing hardware resources as a hierarchical topology of resources and storing data representative of said hardware resources as at least a resource bus type and resource type that is hierarchically subordinate to said resource bus type;

representing active hardware as one or more instances of said resource type said instances being hierarchically subordinate to said resource type;

dynamically updating said hardware resources in said logical representation means to reflect new devices added to the computer system; and allocating resources to satisfy a device driver hardware resource request by creating resource type instances in said active representation.

6. A method for managing device driver detection, acquisition and use of hardware resources as recited in claim 5, wherein said step of logically representing hardware resources includes using one or more computer programs, one of said computer programs obtaining hardware configuration information for each type of input/output resource path.

7. A method for managing device driver detection, acquisition and use of hardware resources as recited in claim 6 wherein the step of allocating includes the step of implementing a grant/yield protocol in which said input/output resource paths may be requested and allocated between a plurality of device drivers.

8. A method for managing device driver detection, acquisition and use of hardware resources as recited in claim 7, wherein the grant/yield protocol implemented by said step of allocating resources comprises the steps of:

requesting, by a first device driver, one of said input/output resource paths;

determining whether said one of said input/output resource paths is currently in use by a second device driver; and using results of the step of determination to assign one of said input/output resource paths to said first device driver if said resource path is not currently in use by said second device driver or to query said second device driver as to whether it will release said input/output path if said resource path is currently in use and using results of said query to notify said first device driver as to whether it can access said input/output resource path.

* * * * *